(12) United States Patent
Zhang et al.

(10) Patent No.: US 9,940,015 B2
(45) Date of Patent: Apr. 10, 2018

(54) INTERACTING WITH APPLICATION BENEATH TRANSPARENT LAYER

(71) Applicant: Lenovo (Singapore) Pte. Ltd., Singapore (SG)

(72) Inventors: Jianbang Zhang, Cary, NC (US); Russell S. VanBlon, Raleigh, NC (US); Joshua N. Novak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 14/797,981

(22) Filed: Jul. 13, 2015

(65) Prior Publication Data

US 2017/0017385 A1    Jan. 19, 2017

(51) Int. Cl.
*G06F 3/048*    (2013.01)
*G06F 3/0488*   (2013.01)
*G06F 3/0484*   (2013.01)
*G06K 9/22*     (2006.01)

(52) U.S. Cl.
CPC ........ *G06F 3/04883* (2013.01); *G06F 3/0484* (2013.01); *G06F 3/04886* (2013.01); *G06K 9/222* (2013.01); *G06F 2203/04803* (2013.01)

(58) Field of Classification Search
CPC ............. G06F 3/04883; G06F 3/04886; G06F 3/0481; G06F 3/0416; G06F 3/03545; G06F 3/04817; G06F 2203/04104; G06F 3/0488; G06F 17/3087; G06F 2203/04803; G06F 11/302; G06F 11/3041; G06F 11/3079; G06F 3/0482; G06F 3/04842; G06F 3/0484; G06F 11/1441; G06F 3/017; G06F 17/24; G06F 3/048

USPC ..... 345/173–175, 1.1–1.3, 2.1–2.3; 715/767, 715/802
See application file for complete search history.

(56) References Cited

U.S. PATENT DOCUMENTS 7,461,348 B2 * 12/2008 Clow ................... G06F 3/0481
                                                        715/767

FOREIGN PATENT DOCUMENTS

EP    1376324       1/2004
JP    2005149240    6/2005

OTHER PUBLICATIONS

Combined Search and Examination Report for Application GB1610711.2, UK Patent Office, dated Nov. 4, 2016, 7 pages.

* cited by examiner

*Primary Examiner* — Duc Q Dinh
(74) *Attorney, Agent, or Firm* — VanLeeuwen & VanLeeuwen; Carlos Munez-Bustamonte (57) ABSTRACT

An approach is provided for associating touch-screen handwriting to application components. Prior to changing focus to a second user interface, a set of handwriting inputs are received at the touch-screen of a device. The received handwriting inputs are associated with an input area of the first user interface that appears on the touch-screen with the first user interface having the system focus while the handwriting inputs were received. Subsequently, when the user changes the focus from the second user interface back to the first user interface, the first set of handwriting inputs are retrieved and converted to a text format and inputted to the input area of the first user interface.

17 Claims, 5 Drawing Sheets

INTERACTING WITH APPLICATION BENEATH TRANSPARENT LAYER

BACKGROUND

For ink to text applications such as Lenovo WRITEit™ and Microsoft's Handwriting IME™, the handwritten ink which has already been written by the user is not associated with any window or input field. Consequently, once the system focus has been changed by the application window being changed or closed, either the handwriting input by the user will be lost or such handwriting input will be directed to a different, incorrect, application. Currently, to prevent such an error from occurring, the user needs to actively convert the handwritten input before the focus is changed to another window or application. This activity may reduce user productivity. Furthermore, some windows or applications, such as instant messaging applications, may "pop-up" and receive focus without the user's active direction or involvement. When a change of focus occurs through such pop-up windows, any handwriting inputs of the user are either lost or directed to an incorrect application, such as an instant messaging application.

SUMMARY

An approach is provided for associating touch-screen handwriting to application components. Prior to changing focus to a second user interface, a set of handwriting inputs are received at the touch-screen of a device. The received handwriting inputs are associated with an input area of the first user interface that appears on the touch-screen with the first user interface having the system focus while the handwriting inputs were received. Subsequently, when the user changes the focus from the second user interface back to the first user interface, the first set of handwriting inputs are retrieved and converted to a text format and inputted to the input area of the first user interface.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
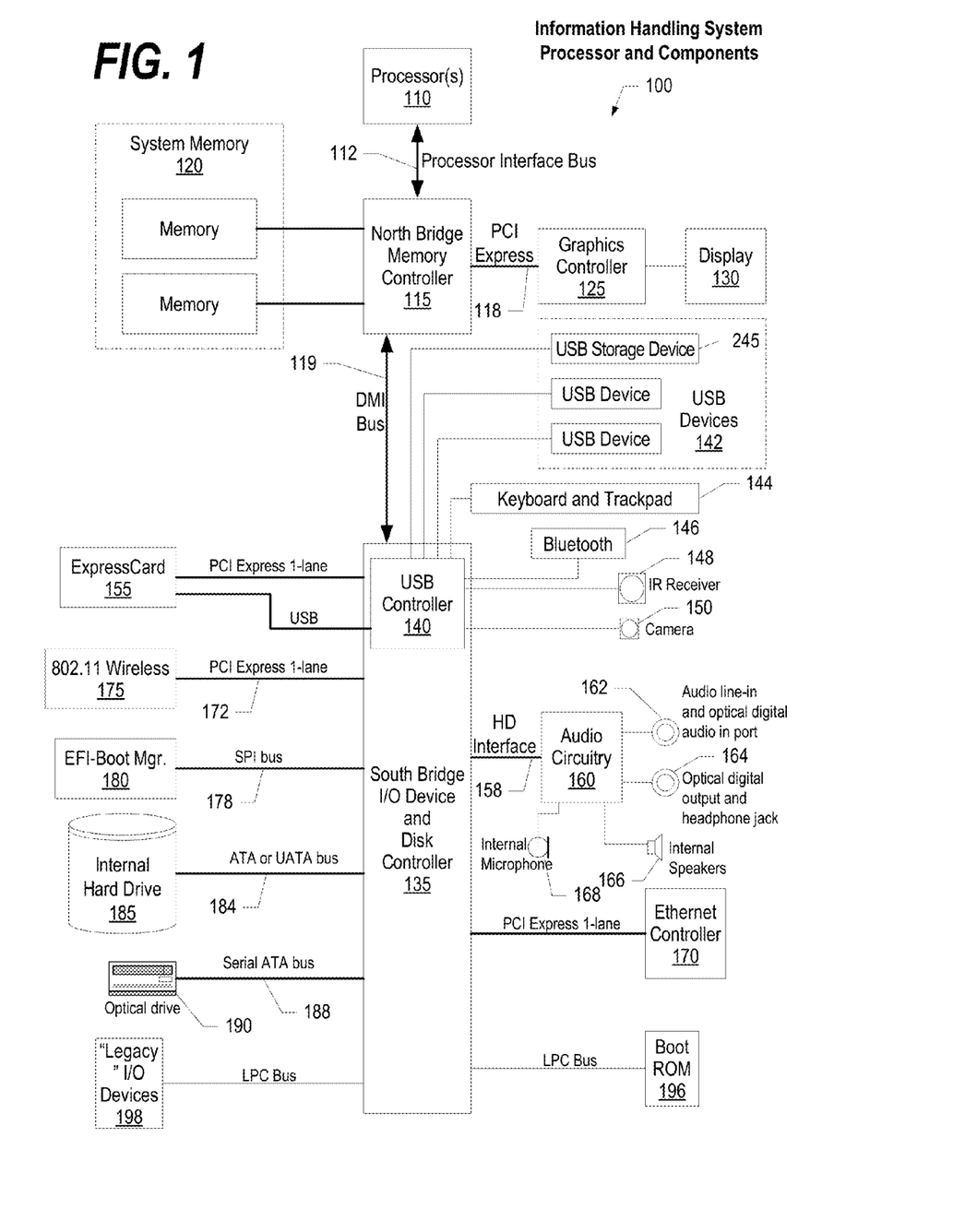
FIG. 1 is a block diagram of a data processing system in which the methods described herein can be implemented.
Figure 2:
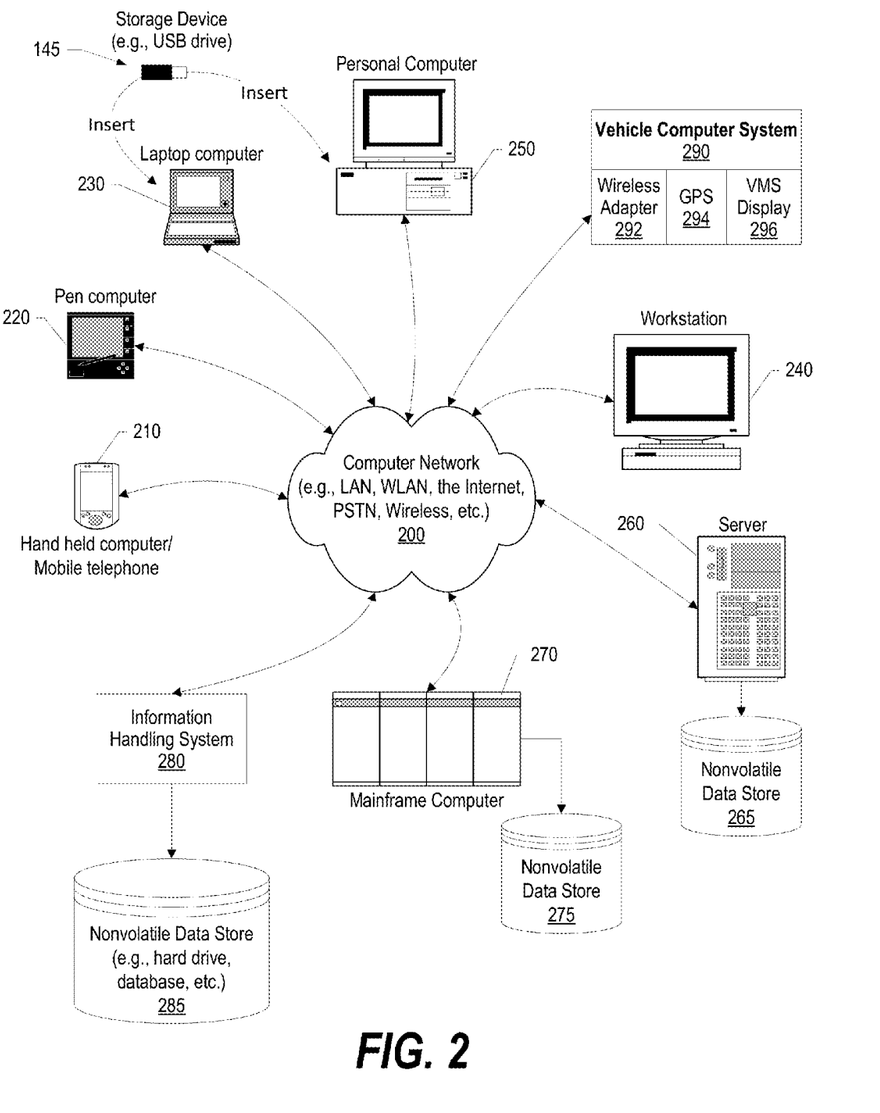
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
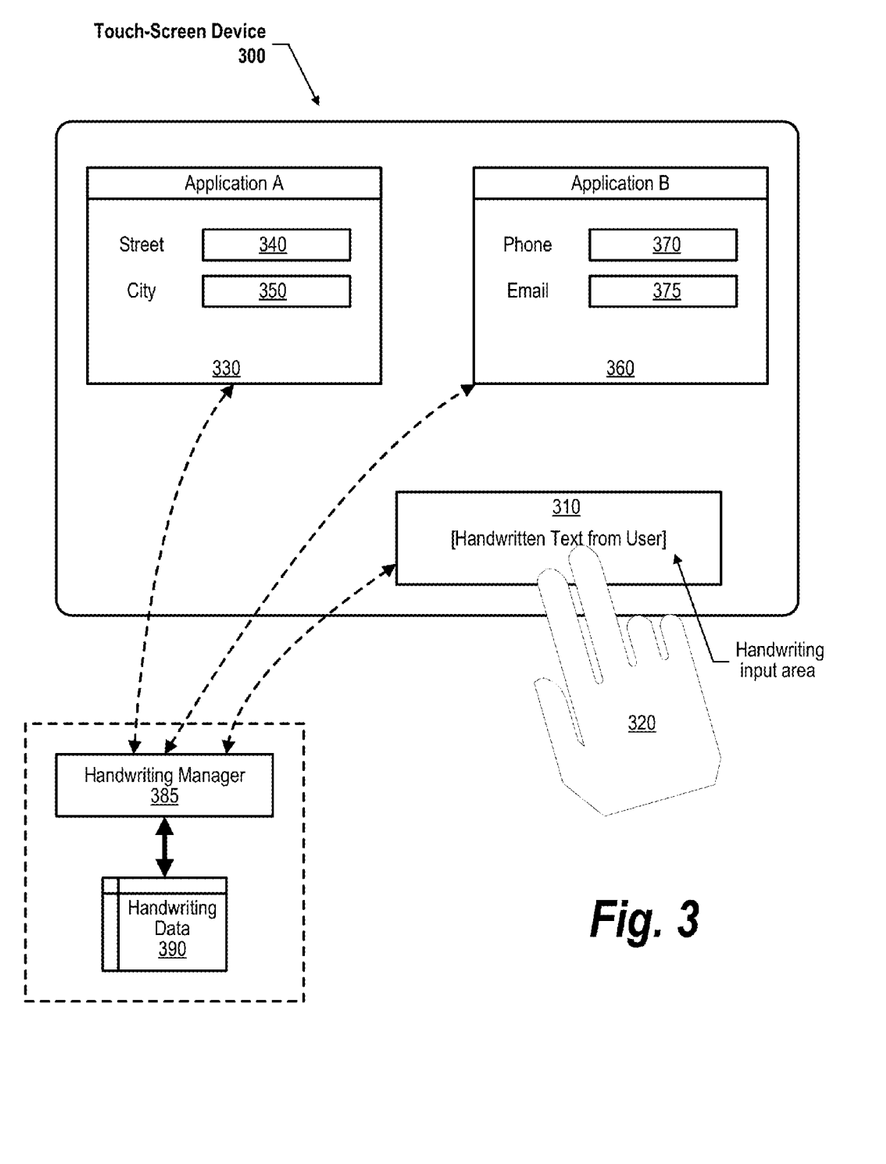
FIG. 3 is a diagram depicting finger-based handwriting inputs being directed to the correct application with use of a handwriting manager component.
Figure 4:
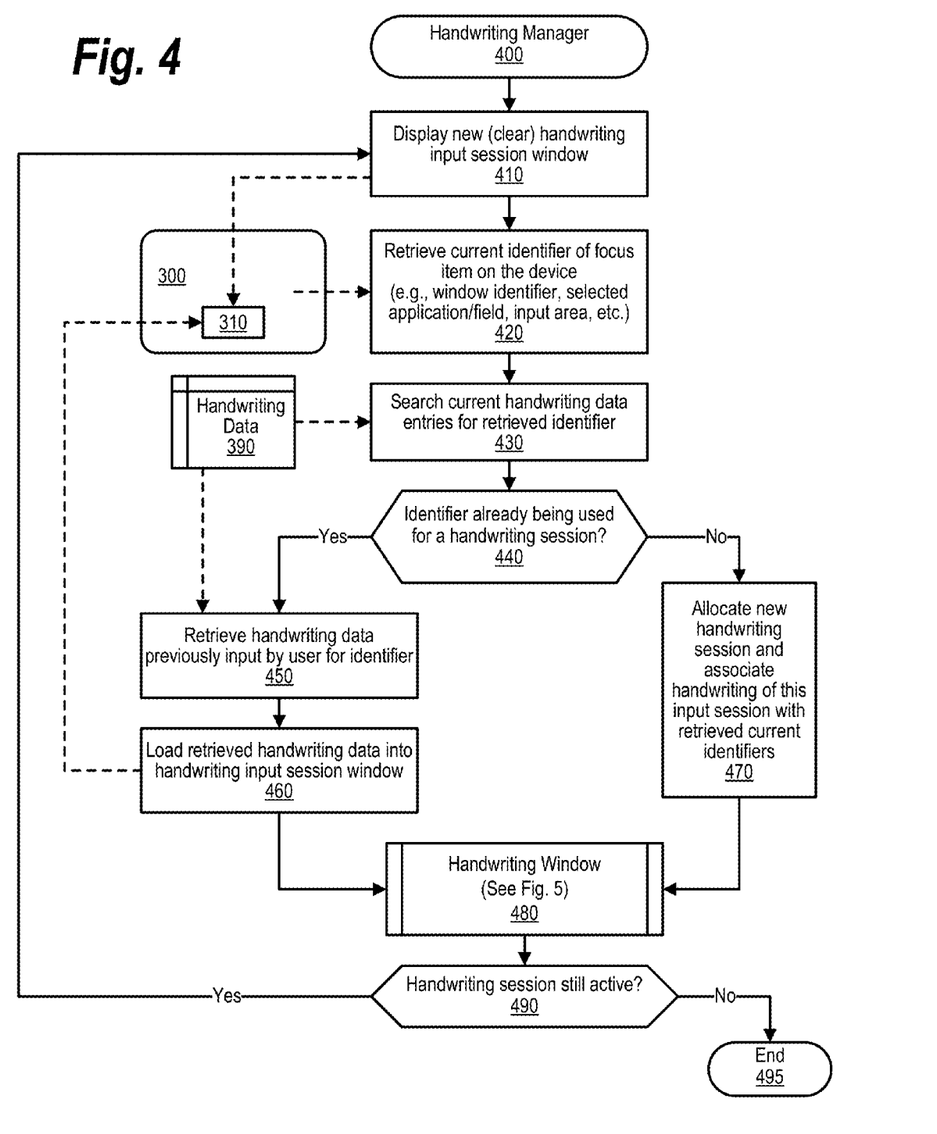
FIG. 4 is a flowchart showing steps taken by the handwriting manager component.
Figure 5:
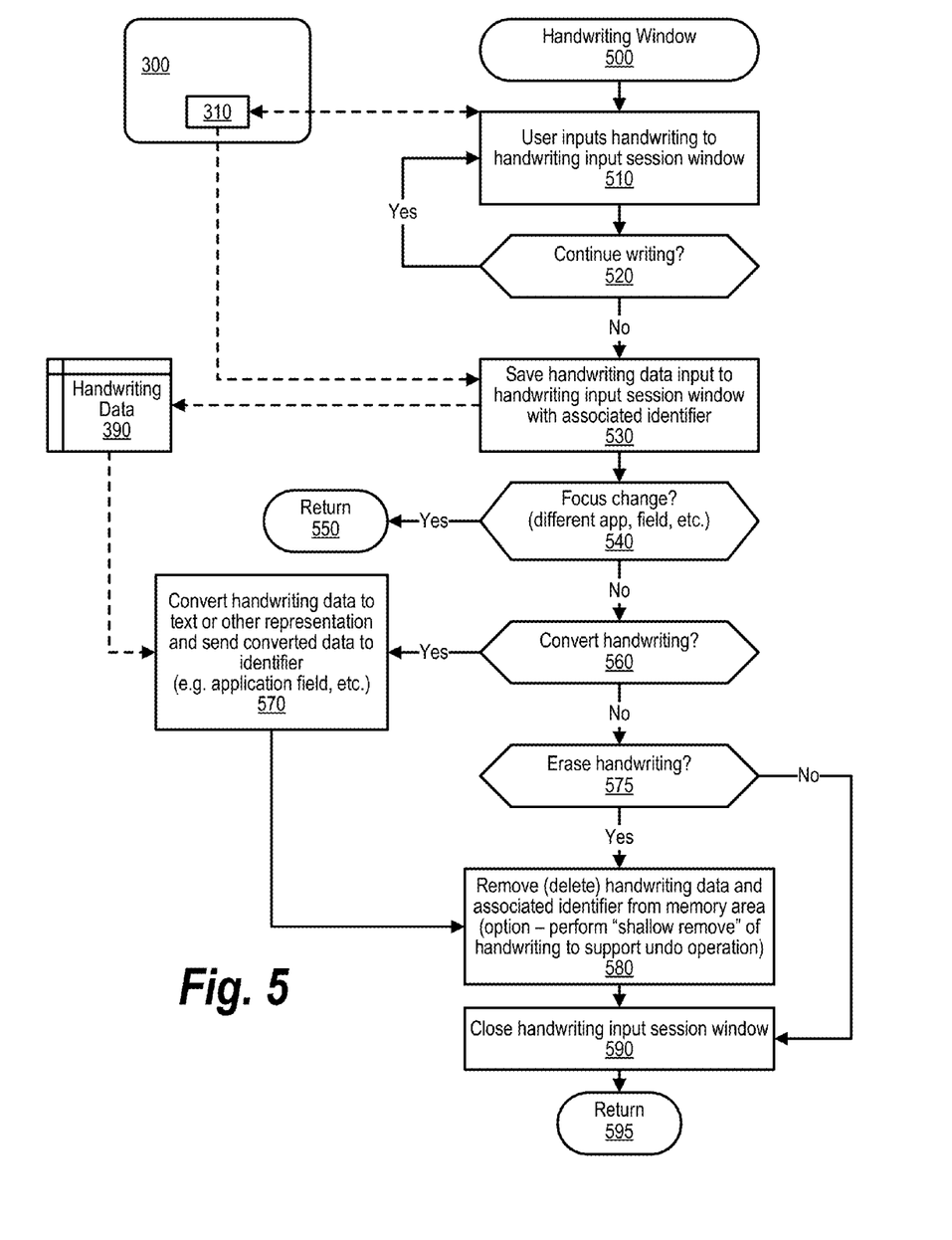
FIG. 5 is a flowchart showing further steps taken by the handwriting manager component in managing the handwriting window that receives the user's handwriting inputs.

FIGS. 3-5 show an approach that users a handwriting manager to keep track of handwritten inputs provided by a user and the intended application of such handwritten inputs. The approach shown herein associates handwritten inputs with the current active application window or input field. In this manner, when the window/field state changes, proper actions can be taken such as keeping handwriting inputs in memory, saving inputs to storage, converting inputs to text and the like. By implementing this approach, the user does not have to worry about losing their handwritten inputs by accident, especially when substantial handwriting has been entered by the user.

In order to associate handwriting with a specific application window or field, a <Key, Value> model can be used to store the window identifier as the key and the handwriting data as the value. In one embodiment, a window identifier is used as a window handle. Handwriting data entered by the user is an abstract data object and might contain all the information about the handwriting input, such as point data, format, structure, recognized result, time stamp and so on.

The following outlines some of the scenarios where the association provided by this approach can be applied. First, when the user opens a new window before existing handwritten inputs are converted/processed, the inputs will be stored first. Later, when user switches back to the old window, the stored inputs will be restored back and show up again for use with the old window. Inputs can be associated with different text input fields, even inside a single application window. So, when the user switches focus between input fields, the stored ink will show up accordingly. When the existing window is about to close for example when user clicks "Send" in an email application, if there are still handwriting inputs present, based on the knowledge of handwriting input associations, the handwriting inputs can be converted to the proper window before the window is actually closed. In a further embodiment, the associated handwriting input can be re-mapped to a different window or field. The associated handwriting input can be updated continuously, and the association can be removed at any time.

FIG. 3 is a diagram depicting finger-based handwriting inputs being directed to the correct application with use of a handwriting manager component. Touch-screen 300 is a display on an information handling system, such as a laptop, tablet, smart phone, traditional computer system or the like. Textbox 310 is presented for user to enter handwritten text using the user's hand 320, stylus, or other such implement. In one embodiment, textbox 310 appears when requested by the user, such as with a command, gesture, or other user input. The user enters handwriting, such as handwritten printing, cursive, or other handwriting input by pressing on the touch-screen surface in the area of textbox 310.

In the example shown, two applications, applications 330 and 360, are being displayed on touch screen display 300. Each of the applications are shown having two input areas, or fields. Application 330 is shown having input areas 340 and 350, while application 360 is shown having input areas 370 and 375. As the name implies, handwriting manager 385 manages the handwriting inputs provided by user 320. The handwriting manager associates the area of focus on the screen with the handwriting that is input by the user. These associations are stored in memory area 390.

For example, if field 340 of application 330 is an input field for a street address and this field has focus when the user provides handwriting input of "123 Main Street", then handwriting manager 385 would associate the handwriting input of "123 Main Street" with input area 340 of application 330. This association is stored in memory area 390. Before converting the address data input into textbox 310, assume that the user changes focus to the email field (field 375) of application 360. The address entered for street address field 340 would be retained in memory area 390 and the handwriting manager would search handwriting data 390 to determine if a handwriting association already existed for the newly selected email field. If such association does not yet exist, then an empty textbox 310 would be displayed and the user could handwrite the email address (e.g., "johndoe@acme.com", etc.).

When the user re-selects the street address field (field 340 of application 330), a new association is stored—this time associating the email field (field 375 of application 360) with the handwritten input (e.g. "johndoe@acme.com"). Now, the handwriting manager searches memory area 390 and finds the previously stored association for the street address fields (e.g., "123 Main Street"). The retrieved handwritten input is displayed in textbox 310 so that the user can edit the handwritten data. When the user wishes to update the field, the user indicates this intention (e.g., using a command, gesture, etc. such as double tapping textbox 310). This causes the handwritten input to be converted to a textual format and the text is input to the input area. In this example, the text "123 Main Street" would appear in street address field 340 for application 330. Now, if the user re-selects the email field, the handwritten input previously associated with the email field is retrieved from memory area 390 and displayed in textbox 310.

FIG. 4 is a flowchart showing steps taken by the handwriting manager component. FIG. 4 processing commences at 400 and shows the steps taken by a process that performs the handwriting manager functions. At step 410, the process displays new (clear) handwriting input session window. The handwriting input session window (textbox 310) is displayed on touch-screen 300. At step 420, the process retrieves the current identifier of focus which is the currently selected item on the device. The current identifier might be a window identifier, a selected application and field, an identifier of a selected input area, etc.

At step 430, the process searches memory area 390 for any currently stored associations for the retrieved identifier. retrieves the data from handwriting data memory area 390. The process determines as to whether the current identifier is already being used for a handwriting session (decision 440). If the current identifier is already being used for a handwriting session, then decision 440 branches to the 'yes' branch to perform steps 450 and 460. At step 450, the process retrieves the handwriting input previously input by user for this identifier. At step 460, the process loads the retrieved handwriting input into the handwriting input session window (textbox 310).

Returning to decision 440, if the current identifier is not already being used for a handwriting session, then decision 440 branches to the 'no' branch to start a new association. At step 470, the process allocates a new handwriting session and associates the handwriting input by the user during this session with the retrieved current identifier.

At predefined process 480, the handwriting manager performs the Handwriting Window routine (see FIG. 5 and corresponding text for processing details). The process determines as to whether the handwriting session is still active and has not yet been closed by the user (decision 490). If the handwriting session is still active, then decision 490 branches to the 'yes' branch which loops back to step 410 to re-perform the process as described above. This looping continues until the handwriting session is no longer active, at which point decision 490 branches to the 'no' branch exiting the loop. FIG. 4 processing thereafter ends at 495.

FIG. 5 is a flowchart showing further steps taken by the handwriting manager component in managing the handwriting window that receives the user's handwriting inputs. FIG. 5 processing commences at 500 and shows the steps taken by a process that performs the handwriting window routine. At step 510, the users inputs handwriting to handwriting input session window (e.g., textbox 310). The process determines as to whether the user continues handwriting or selects something else on the touch-screen (decision 520). If the user continues handwriting, then decision 520 branches to the 'yes' branch which continues to loop back to step 510 for the user to continue providing handwriting inputs. This continues until the user selects something else on the touch screen display, at which point decision 520 branches to the 'no' branch to process the user's action.

At step 530, the process saves the handwriting input data provided by the user to the handwriting input session window along with associated identifier. Step 530 stores the association (identifier and handwriting input associated with the identifier) in handwriting data memory area 390. The process determines as to whether a focus change occurred on the device (decision 540), such as the user selecting on a different input field as shown in FIG. 3. If a focus change occurred, then decision 540 branches to the 'yes' branch whereupon processing returns to the calling routine (see FIG. 4) at 550. Note that processing returns without closing the input session window so that the input session window is still available to receive handwriting input associated with the newly selected application/field that is now of focus. Returning to decision 540, if a focus change did not occur, then decision 540 branches to the 'no' branch to continue processing the action.

The process next determines as to whether the user requested to convert handwriting input to textual data (decision 560). If the user requested to convert handwriting input to textual data, then decision 560 branches to the 'yes' branch whereupon at step 570, the process converts handwriting input by the user to text or other representation and then sends the converted data to the identifier (e.g. an application field, etc.). Once the handwriting has been converted, then, at step 580, process removes (deletes) the handwriting input data and the associated identifier from memory area 390. In other words, step 580 deletes the association from memory. In one embodiment, rather than removing the handwriting input data from the memory, step 580 performs a "shallow remove," during which the handwriting is visually removed so that the user does not see the ink anymore even when they switch windows, however the shallow remove supports an "undo" operation so that the user can undo the conversion operation and then the ink will reappear. On the other hand, if the user did not request to convert handwriting input to textual data, then decision 560 branches to the 'no' branch bypassing step 570.

A decision is made by the process as to whether the user wishes to erase the handwriting input currently associated with the current identifier (decision 575). If the user wishes to erase the handwriting input currently associated with the current identifier, then decision 575 branches to the 'yes' branch to erase the handwriting data at step 580 (or perform the "shallow remove" as discussed above). On the other hand, if the user does not wish to erase the handwriting input currently associated with the current identifier, then decision 575 branches to the 'no' branch bypassing step 580.

At step 590, the process closes the handwriting input session window. FIG. 5 processing thereafter returns to the calling routine (see FIG. 4) at 595.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
   prior to changing focus to a second user interface, receiving a first handwriting input at a touch-screen of a device and associating the first handwriting input with an input area of a first user interface appearing on the touch-screen, wherein the first user interface was of focus while the associated user handwriting inputs was received;
   after re-changing focus from the second user interface back to the first user interface, converting the first handwriting input to a first plurality of textually formatted data;
   inputting the textual formatted data to the input area of the first user interface;
   receiving and associating a second handwriting input at the touch-screen while with the second user interface that has focus;
   wherein the first user interface corresponds to a first unique identifier and the second user interface corresponds to a second unique identifier; and
   after changing focus from the first user interface to the second user interface, searching a memory area for an association between the identifier corresponding to the second user interface and a second handwriting input and, when found, displaying the second handwriting input in a handwriting input area of the touchscreen.

2. The method of claim 1 further comprising:
   removing a display of the first handwriting input from the touch-screen in response to the changing of the focus to the second user interface; and
   prior to converting the first handwriting input to the plurality of textual formatted data, redisplaying the first handwriting input on the touch-screen after re-changing focus from the second user interface back to the first user interface.

3. The method of claim 1 further comprising:
   in response to the search failing to find the association:
   associating the second identifier and the second handwriting input that is currently empty; and
   displaying the empty second writing input in the handwriting input area of the touch-screen.

4. The method of claim 3 further comprising:
   receiving one or more handwriting inputs from the user through the handwriting input area; and
   adding the one or more handwriting inputs received from the user to the second handwriting input associated with the second user interface in the memory area.

5. The method of claim 3 further comprising:
   in further response to the searching finding the association:
   receiving a conversion request from the user;
   converting the second handwriting input to a second plurality of textually formatted data; and
   inputting the second plurality of textually formatted data to an input area of the second user interface.

6. The method of claim 5 further comprising:
   clearing the second handwriting input from the memory area in response to converting the second handwriting input.

7. An information handling system comprising: one or more processors;
   a touch-screen accessible by at least one of the processors;
   a memory coupled to at least one of the processors; and
   a set of instructions stored in the memory and executed by at least one of the processors to:
   prior to changing focus to a second user interface, receive a first handwriting input at a touch-screen of a device and associate the first handwriting input with an input area of a first user interface that appears on the touch-screen, wherein the first user interface was of focus while the associated user handwriting inputs was received;
   after a re-change of focus from the second user interface back to the first user interface, convert the first handwriting input to a first plurality of textually formatted data;
   input the textual formatted data to the input area of the first user interface;
   receive and associate a second handwriting input at the touch-screen while with the second user interface that has focus;
   wherein the first user interface corresponds to a first unique identifier and the second user interface corresponds to a second unique identifier; and
   after changing focus from the first user interface to the second user interface, searching a memory area for an association between the identifier corresponding to the second user interface and a second handwriting input and, when found, display the second handwriting input in a handwriting input area of the touch-screen.

8. The information handling system of claim 7 wherein the instructions are further executed by the processors to:
   remove a display of the first handwriting input from the touch-screen in response to the change of the focus to the second user interface; and
   prior to converting the first handwriting input to the plurality of textual formatted data, redisplay the first handwriting input on the touch-screen after the re-change of focus from the second user interface back to the first user interface.

9. The information handling system of claim 7 wherein the instructions are further executed by the processors to:
   in response to the search failing to find the association:

associate the second identifier and the second handwriting input that is currently empty; and display the empty second writing input in the handwriting input area of the touch-screen.

10. The information handling system of claim 9 wherein the instructions are further executed by the processors to:

receiving one or more handwriting inputs from the user through the handwriting input area; and adding the one or more handwriting inputs received from the user to the second handwriting input associated with the second user interface in the memory area.

11. The information handling system of claim 9 wherein, in further response to the search finding the association, the instructions are further executed by the processors to:

receive a conversion request from the user;

convert the second handwriting input to a second plurality of textually formatted data; and input the second plurality of textually formatted data to an input area of the second user interface.

12. The information handling system of claim 11 wherein the instructions are further executed by the processors to:

clear the second handwriting input from the memory area in response to converting the second handwriting input.

13. A computer program product comprising:

a computer readable storage medium comprising a set of computer instructions, the computer instructions effective to:

prior to changing focus to a second user interface, receive a first handwriting input at a touch-screen of a device and associate the first handwriting input with an input area of a first user interface that appears on the touch-screen, wherein the first user interface was of focus while the associated user handwriting inputs was received;

after a re-change of focus from the second user interface back to the first user interface, convert the first handwriting input to a first plurality of textually formatted data;

input the textual formatted data to the input area of the first user interface;

receive and associate a second handwriting input at the touch-screen while with the second user interface that has focus;

wherein the first user interface corresponds to a first unique identifier and the second user interface corresponds to a second unique identifier after changing focus from the first user interface to the second user interface, searching a memory area for an association between the identifier corresponding to the second user interface and a second handwriting input and, when found, display the second handwriting input in a handwriting input area of the touch-screen.

14. The computer program product of claim 13 wherein the set of instructions comprise additional instructions effective to:

remove a display of the first handwriting input from the touch-screen in response to the change of the focus to the second user interface; and prior to converting the first handwriting input to the plurality of textual formatted data, redisplay the first handwriting input on the touch-screen after the re-change of focus from the second user interface back to the first user interface.

15. The computer program product of claim 13 wherein the set of instructions comprise additional instructions effective to:

in response to the search failing to find the association:

associate the second identifier and the second handwriting input that is currently empty; and display the empty second writing input in the handwriting input area of the touch-screen.

16. The computer program product of claim 15 wherein the set of instructions comprise additional instructions effective to:

receiving one or more handwriting inputs from the user through the handwriting input area; and adding the one or more handwriting inputs received from the user to the second handwriting input associated with the second user interface in the memory area.

17. The computer program product of claim 15 wherein, in further response to the search finding the association, the set of instructions comprise additional instructions effective to:

receive a conversion request from the user;

convert the second handwriting input to a second plurality of textually formatted data;

input the second plurality of textually formatted data to an input area of the second user interface; and clear the second handwriting input from the memory area in response to converting the second handwriting input.

* * * * *